United States Patent
Fox et al.

(10) Patent No.: US 8,762,227 B1
(45) Date of Patent: Jun. 24, 2014

(54) AUTOMATIC PRODUCT GROUPINGS FOR MERCHANDISING

(75) Inventors: Eric B. Fox, Seattle, WA (US); Logan Luyet Dillard, Seattle, WA (US); Scott Allen Mongrain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 310 days.

(21) Appl. No.: 13/175,042

(22) Filed: Jul. 1, 2011

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0631* (2013.01); *G06Q 30/0601* (2013.01); *G06Q 30/0201* (2013.01); *G06Q 30/0204* (2013.01); *G06Q 30/0253* (2013.01); *G06Q 30/0255* (2013.01)
USPC ....... 705/26.7; 705/26.1; 705/7.29; 705/7.33; 705/14.51; 705/14.53

(58) Field of Classification Search
CPC .......... G06Q 30/0601; G06Q 30/0631; G06Q 30/0201; G06Q 30/0204; G06Q 30/0206; G06Q 30/0253; G06Q 30/0255
USPC ................ 705/7.29, 7.33, 7.35, 14.51, 14.53, 705/26.1, 26.7
See application file for complete search history.

(56) References Cited

U.S. PATENT DOCUMENTS

| | | | | |
|---|---|---|---|---|
| 6,912,505 B2 * | 6/2005 | Linden et al. | ............... | 705/14.53 |
| 7,571,121 B2 * | 8/2009 | Bezos et al. | ................. | 705/26.7 |
| 7,739,203 B2 * | 6/2010 | Kettner et al. | ................ | 705/400 |
| 7,783,648 B2 * | 8/2010 | Bateni et al. | .................. | 707/752 |
| 8,065,203 B1 * | 11/2011 | Chien et al. | ................... | 705/7.31 |
| 8,260,656 B1 * | 9/2012 | Harbick et al. | .............. | 705/26.7 |
| 8,301,514 B1 * | 10/2012 | Vippagunta | .................. | 705/26.7 |
| 8,407,096 B2 * | 3/2013 | Mathe et al. | .................... | 705/22 |
| 8,548,876 B1 * | 10/2013 | Fox et al. | ..................... | 705/26.7 |
| 2005/0177440 A1 * | 8/2005 | Mathe et al. | ................... | 705/26 |
| 2005/0197971 A1 * | 9/2005 | Kettner et al. | ................ | 705/400 |
| 2005/0203807 A1 * | 9/2005 | Bezos et al. | ..................... | 705/26 |
| 2009/0012979 A1 * | 1/2009 | Bateni et al. | ................. | 707/101 |

FOREIGN PATENT DOCUMENTS

WO    WO-03/001944 A1 *   3/2003

OTHER PUBLICATIONS

Yang, Q., et al., "Clique Discovery Based on User Similarity for Online Shopping Recommendation," Information Technology Journal, vol. 10, No. 8, pp. 1587-1593, 2011.*
U.S. Appl. No. 13/175,046 Non-Final Rejection, dated Feb. 8, 2013.*
U.S. Appl. No. 13/175,046 Allowance, dated May 28, 2013.*
Amazon.com webpages dated Jun. 1, 2010.*

* cited by examiner

*Primary Examiner* — Nicholas D Rosen (74) *Attorney, Agent, or Firm* — Thomas | Horstemeyer, LLP (57) ABSTRACT

Disclosed are various embodiments for defining subcategories of product items to be used in merchandising. The subcategories may be defined on the basis of product data and/or sales data for the product items. Based on a distribution of the product items in accordance with one or more of the product and/or sales data, implicit groups or subcategories can be identified and selected for merchandising purposes.

25 Claims, 9 Drawing Sheets

AUTOMATIC PRODUCT GROUPINGS FOR MERCHANDISING

BACKGROUND

In retail environments, customers often have a general idea of what they want (e.g., a baby stroller) but need help figuring out which type or brand of the product they should purchase. Accordingly, customers might need advice in selecting a subcategory (e.g., product category, brand, or price range) or subgrouping of the product in which to focus their attention. As such, online and offline merchandisers often create displays that highlight the relevant subcategories of products. These displays are typically created manually by experts with domain expertise and/or are arbitrarily created for use with a wide variety of products in different product categories.

DETAILED DESCRIPTION

The present disclosure relates to merchandising in an online retail establishment. Various embodiments of the present disclosure automatically group product items of a specific category (e.g., blenders, vacuums, etc.) into subgroups or subcategories (e.g., countertop blenders, upright vacuums, etc.) and present the subcategories to interested customers as an option for viewing a smaller number of product items in a selected subcategories as opposed to all the product items in the main category. The selection of subcategories aims to be intelligent in that it represents implicit subcategories of product items. Accordingly, product items can easily be narrowed to subcategories based on pricing, as one example, or other characteristics. In this example then, customers can easily select a price subcategory or range they are interested in ("I'm looking for budget options" vs. "I'm willing to spend more for more features" vs. "I really want the best"). Thus, customers are educated about the landscape of product items available in the category by being shown the different price ranges or bands.

Figure 1:
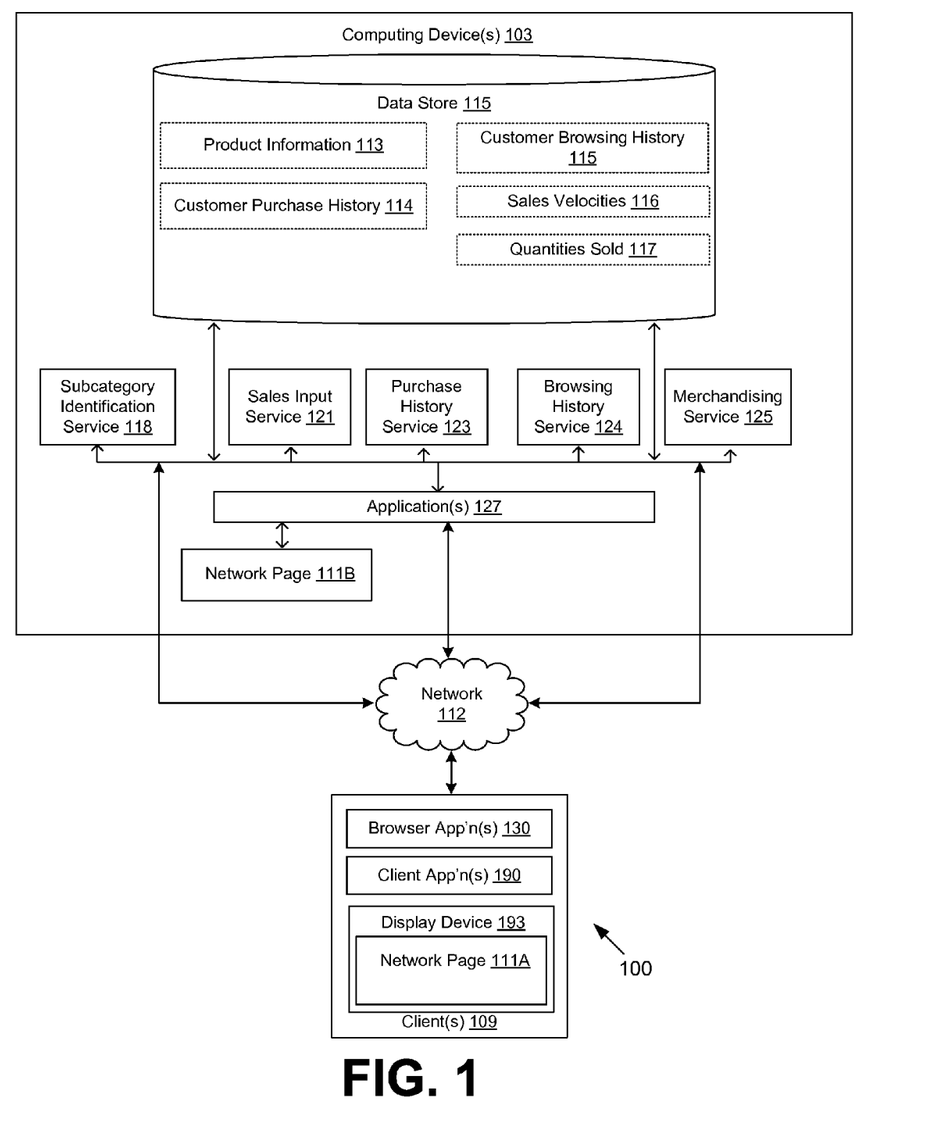
FIG. 1 is a drawing of a networked environment according to various embodiments.

With reference to FIG. 1, shown is a networked environment 100 according to various embodiments. The networked environment 100 includes one or more computing devices 103 in data communication with one or more clients 109 by way of a communication network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a subcategory identification service 118, a sales input service 121, a purchase history service 123, a browsing history service 124, a merchandising service 125, and other applications 127, services, processes, systems, engines, or functionality not discussed in detail herein. The subcategory identifications service 118 is executed to identify subcategories or subgroupings of product items that are determined based on how the product items are distributed amongst themselves thereby revealing implicit groupings of product items.

The sales input service 121 is executed to accept characteristics or feedback on the product items (e.g., sales data, ratings data, etc.) that may be used to define the distribution of the product items. The purchase history service 123 is executed to retrieve and analyze a customer's purchase history and use this information to formulate merchandising presentations. The browsing history service 124 is executed to retrieve and analyze a customer's browsing habits and history and use this information to formulate merchandising presentations. The merchandising service 125 is executed to promote one or more product items being sold on the online retail establishment with presentation of the identified subcategories or subgroupings for one or more product items. The presentation is intended to stimulate interest in making a purchase of a product item by a customer.

The applications 127 correspond to hosted applications that may access the data stored in the online retail establishment. Various applications 127 may, for example, have a web-based interface and may render network pages 111 (e.g., 111A, 111B, 111C (FIG. 2)), such as web pages or other forms of network content, to facilitate user interaction. Other applications 127 may include internal applications that may not have a web-based interface. Non-limiting examples of applications 127 may include mathematical clustering algorithms, data mining programs, and so on.

The data stored in the data store 115 includes, for example, product information 113 including product prices, product model numbers, product descriptions, product categories, product features, etc., and potentially other data including customer purchase history 114, customer browsing history 115, and sales metrics such as sales velocities 116 and quantities sold 117 for particular products among others.

The client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, a set-top box, music players, web pads, tablet computer systems, game consoles, or other devices with like capability. The client 109 may also include, for example various peripheral devices. In particular, the peripheral devices may include input devices such as, for example, a keyboard, keypad, touch pad, touch screen, microphone, scanner, mouse, joystick, or one or more push buttons, etc.

The client 109 may be configured to execute various applications such as a browser application 130 and/or other client applications 190. The browser application 130 and/or client applications 190 are configured to interact with the computing device 103 and related applications on the computing device 103 according to an appropriate protocol such as the Internet Protocol Suite comprising Transmission Control Protocol/Internet Protocol (TCP/IP) or other protocols. To this end, the browser application 130 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 130 may comprise some other application with like capability.

When executed in the client 109, the browser application 130 renders network pages 111A on the display device 193. Network pages 111A indicating content regarding product items in an online retail establishment can include one or more merchandizing presentations(s), including breakdowns of product items into subcategories, to the user or customer.

Next, a general description of the operation of the various components of the networked environment 100 is provided. To begin, a customer may view a network page 111 (e.g., 111A, 111B, 111C (FIG. 2)) of an online retail establishment via a client 109. The network page 111B is provided by the computing device 103. For example, the network page 111B may provide the customer with an option to select a category of product items to browse. Accordingly, the customer may input or select the category of "baby strollers." After receiving the selection from the customer, the computing device 103 provides the customer with a network page 111A to a storefront of the baby stroller department of the online retail environment. This network page 111A provides additional options for the customer to choose from including subcategories of baby strollers that may be of interest to the customer by a merchandising service 125. In one embodiment, the subcategories are ranges of prices for the baby strollers. The price ranges are defined, by the subcategory identification service 118, based on the distribution of the prices and related data for the particular baby stroller product items offered for sale. The subcategory identification service 118 may utilize data (e.g., sales velocities, number of units sold, revenue data, product keywords, etc.) obtained from a sales input service 121 to help determine how to partition or separate the baby stroller product items into particular subcategories. Further, the merchandising service 125 may utilize data from a purchase history service 123 and/or a browsing history service 124 to help recommend a particular subcategory of baby stroller product items to a particular customer that may be deemed of interest.

Figure 2:
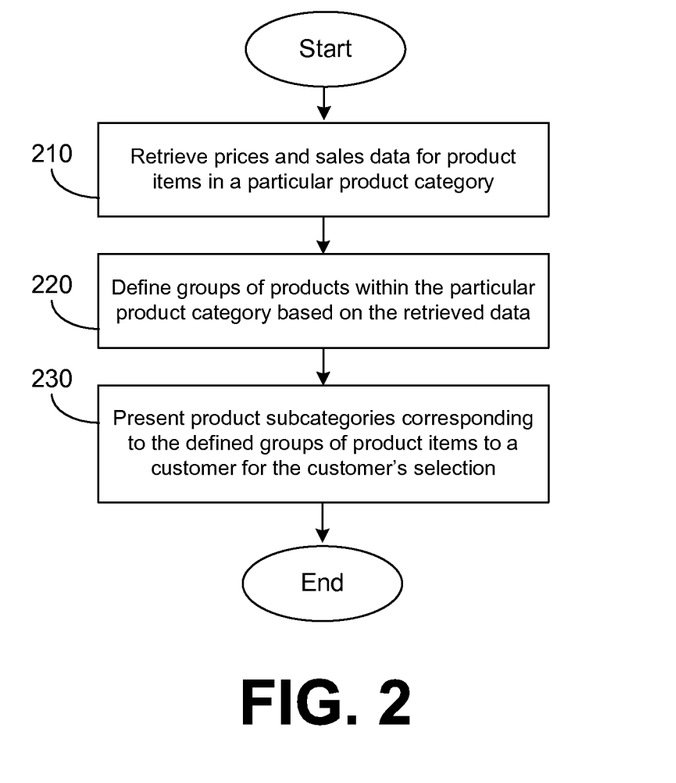
FIG. 2 is a flowchart illustrating one example of functionality implemented as portions of a subcategory identification service executed in a computing device in the networked environment of FIG. 1 according to various embodiments of the present disclosure.

Referring next to FIG. 2, shown is a flowchart that provides one example of the operation of a portion of the subcategory identification service 118 (FIG. 1) according to various embodiments. It is understood that the flowchart of FIG. 2 provides merely an example of the many different types of functional arrangements that may be employed to implement the operation of the portion of the subcategory identification service 118 (FIG. 1) as described herein. As an alternative, the flowchart of FIG. 2 may be viewed as depicting an example of steps of a method implemented in the computing device 103 (FIG. 1) according to one or more embodiments.

Beginning with box 210, the subcategory identification service 118 retrieves current prices and sales data (e.g., sales velocities, counts of units sold, etc.) for product items in a particular product category. In box 220, the subcategory identification service 118 (FIG. 1) performs defining groups or subcategories of product items within the product category based on the retrieved data. Then, in box 230, the merchandising service 125 (FIG. 1) presents product subcategories available for selection by a customer corresponding to the defined groups of product items. Based on how often the pricing information and/or sales data are updated, new subcategories may be defined and identified based on the new pricing information and/or sales data. This update of the subcategories may be automatically triggered by a notification or detection of the updating of the pricing information and/or sales data.

Consider that often in today's retail establishments, product items are grouped into default price categories (or subcategories). For example, the price categories may correspond to price bands, such as $0-$50, $50-$100; $100-$200; and $200 and up. Accordingly, for a compact disc music category, a compact disc having the price of $11 would be grouped in the $0-$50 category along with a compact disc having the price of $40. However, a $11 compact disc is generally considered to be an average price for a compact disc and a $40 compact disc is considered to be a high-end price for a compact disc, and therefore, they do not seem to fit in the same subcategory (e.g., $0-$50 price band). Therefore, using default groupings, irrespective to the actual distribution of prices in a product category, is problematic. Accordingly, the use of intelligent price groupings is beneficial, where the partitions between price groupings is not arbitrarily determined or set.

The identification of subcategories is not limited to being based on pricing information. In various embodiments, descriptions and product features may be analyzed to identify subcategories of product items sharing common features or descriptors. For example, in various embodiments, common words in product features or product reviews may be used to cluster or group product items and identify relevant subcategories. Therefore, groupings of product items having similarities may be defined based upon sales data, product data including pricing information, or other metrics.

As stated above, product items may be grouped into subcategories on the basis of product pricing. Such a process automatically generates price clusters or groupings that are implicitly defined in the pricing data. These price groupings are based on the distribution of product items in a product category in accordance with pricing information and related data and not based on default price ranges that may not be relevant to particular product categories.

Various embodiments employ different methodology for defining the subcategories. As an example, the number of groups or clusters that are defined can be preordained. Alternatively, the data used in performing the clustering can be used to find a number of clusters that optimally fits the data. Various embodiments utilize various clustering algorithms. For example, in one embodiment where groupings based on pricing information is to be used and the number of groupings is fixed or preordained, a k-means clustering algorithm on the log(base 2) of the prices (that essentially assumes a log-normal distribution of prices within a price cluster) may be performed. It is also noted that other clustering approaches, including optimal clustering algorithms, may also be performed.

As an example, in an embodiment where the number of groupings is not restricted to being a set number, a clustering algorithm (via sum of squared distances) on the log of the prices (that assumes a log-normal distribution of prices within a price cluster) may be performed. For example, the k-means clustering algorithm may be executed for different k-values. For each k-value of the actual pricing data, the resulting error measure corresponding to the sum of squared values from the mean of each cluster may be compared against an error measure obtained using evenly distributed data across the same pricing range. The logarithms of the two error measures obtained using actual pricing data and evenly distributed pricing data for the k-value) may be computed and the difference between the two logarithm values may be considered the gap value. The gap value may be obtained for different k-values and whichever k-value maximizes the gap value may then be determined to correspond to the optimal number of clusters. This is one of many possible techniques that are contemplated and may be employed by embodiments of the present disclosure. Other techniques, including optimal clustering algorithms, may also be employed.

In the above example, a weight value may be assigned per product item in the respective clustering algorithm. In one embodiment, a per product weight equal to the recent sales volume, among other possible values, is used. The recent sales volume metric may also be used for other merchandising components such as determining best-seller rankings, among others. The recent sales volume indicates how well a product has sold recently and may be obtained from the sales input service 121 (FIG. 1). In particular, recent sales volume is a time-decayed measurement of recent sales volume that may be updated periodically (e.g., hourly). The recent sales volume may provide a prediction of sales volume for a product item in an upcoming period of time (e.g., an upcoming week). In various embodiments, alternative to using recent sales volume metrics, the number of units of a product sold in a defined period (e.g., a month) may also be used.

In addition to taking a log-scale of pricing data, the pricing data may also be adjusted by adding an offset to the pricing data before taking the log-scale; rounding to a nearest whole number increment; or to a particular number increment such as $5. These adjustments to unit values can change the representations of plotted values. For example, taking a log-scale of a range of values may extremely affect small number values. Therefore, adding a fixed offset value to all the numbers may help to ameliorate these effects after the log-scale is taken.

Figure 3:
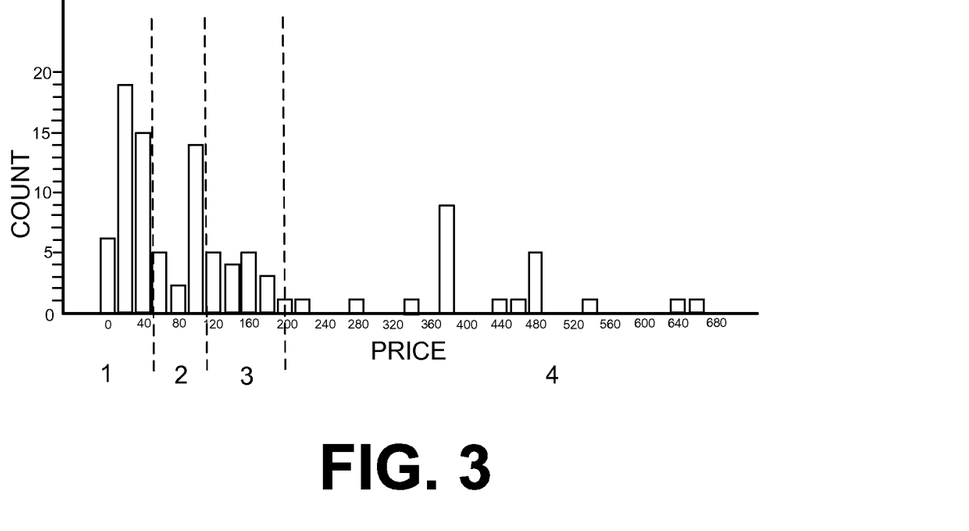
FIGS. 3 and 5 are chart diagrams that provide example illustrations of distributions of product items in a product category that have been partitioned into subcategories using default or set partitions according to pricing information.

Referring now to FIG. 3, a chart is shown plotting a distribution of product items in a blender product category in accordance with pricing information verses a count of the number of units sold for the product items for a period of time. One approach to partitioning the product items into subcategories may be to use default groupings such $0 to $50 (Group 1); $50 to $100 (Group 2); $100 to $200 (Group 3); and $200 and up (Group 4). As shown in the chart, Group 3 does not contain any of the high-selling product items (e.g., count of 6 or more) unlike Groups 1, 2, and 4. Accordingly, a more even distribution of product items based on pricing information and related data may be desired.

Figure 4:
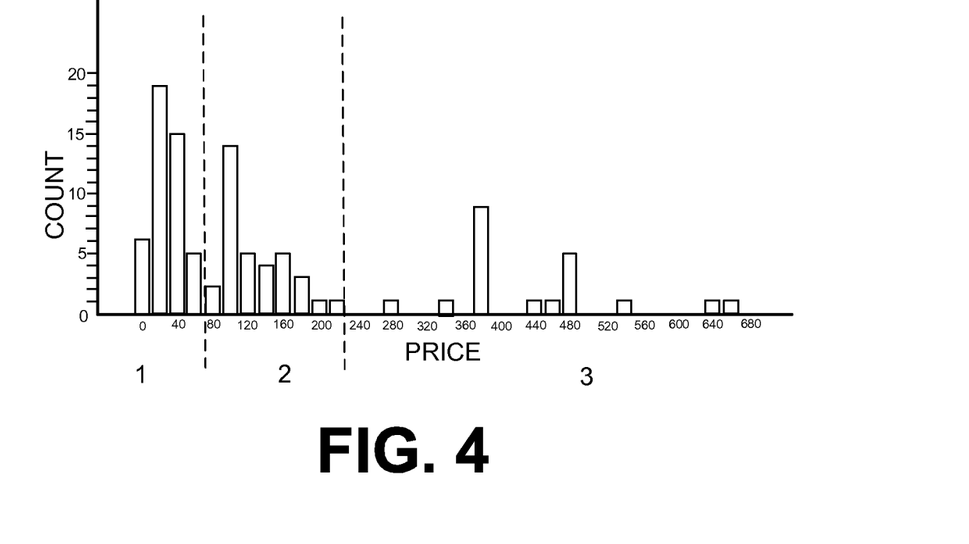
FIGS. 4 and 6 are chart diagrams that provide example illustrations of distributions of product items in a product category that have been partitioned into subcategories in accordance with pricing information and sales data according to various embodiments of the present disclosure.

Another approach to partitioning the product items may be to employ a clustering algorithm to analyze the distribution of pricing information for the product items and find clusters or groups within the distribution that will constitute the subcategories. In an example shown in FIG. 4, a clustering algorithm is used to identify the following subcategories: $0-$70 (Group 1); $70-$230 (Group 2); and $230 and up (Group 3). These groups follow the implicit groupings that are evident in the distribution of prices for the product items. As shown in the chart, Groups 1, 2, and 3 each contain high-selling product items (e.g., count of 6 or more).

Figure 5:
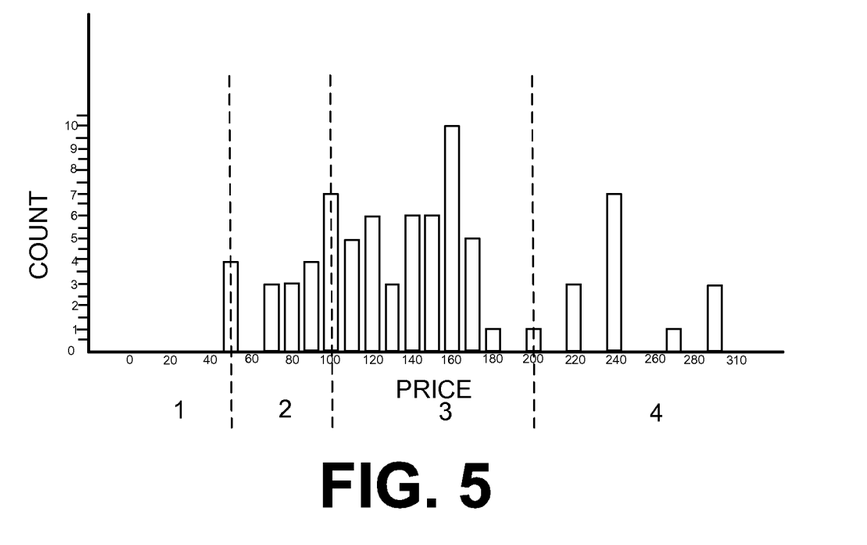
Figure 6:
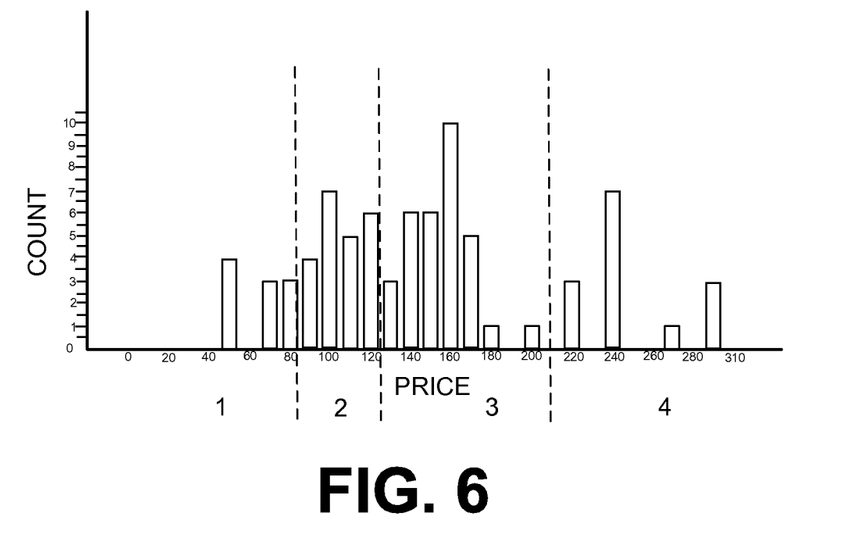

Now, referring now to FIGS. 5-6, two different charts are shown plotting a distribution of prices for product items in an infant car seat product category verses a count of the number of units sold for the product items for a period of time. In an example shown in FIG. 5, the product items are grouped into default groupings irrespective of a pattern of distribution of the prices for the product items. The following default subcategories may be identified as $0-$50 (Group 1); $50-$100 (Group 2); $100-$200 (Group 3); and $200 and up (Group 4). As shown in the figure, there are few product items in Group 1 and the majority of product items situated in Group 3.

In contrast, FIG. 6 shows an example where a clustering algorithm is used to identify the following subcategories: $0-$85 (Group 1); $85-$127 (Group 2); $127-$210 (Group 3); and $210 and up (Group 4). These groups follow the implicit groupings that are evident in the distribution of prices for the product items. Each of the groupings in this example contains a more evenly distributed apportionment of the product items.

Figure 7:
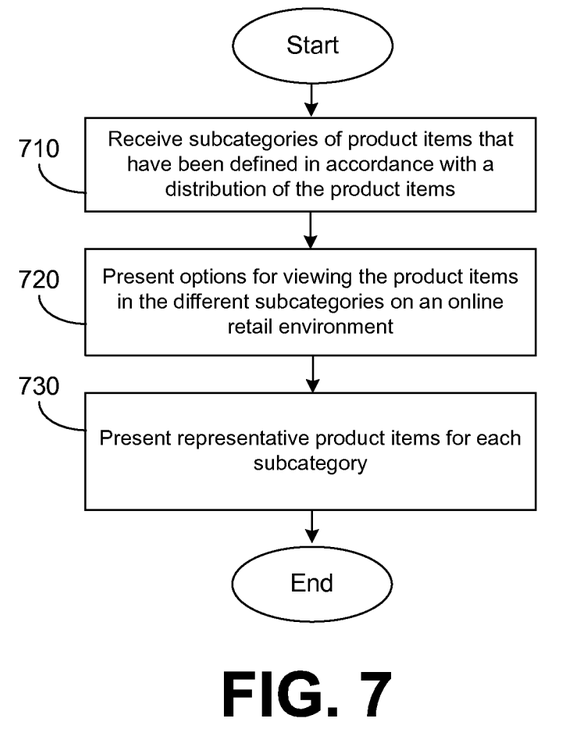
FIG. 7 is a flowchart illustrating one example of functionality implemented as portions of a merchandising service executed in a computing device in the networked environment of FIG. 1 according to various embodiments of the present disclosure.

Referring next to FIG. 7, shown is a flowchart that provides one example of the operation of a portion of the merchandising service 125 (FIG. 1) according to various embodiments. Beginning with box 710, the merchandising service 125 (FIG. 1) receives product subcategories defined and identified by the subcategory identification service 118 (FIG. 1) in accordance with distribution of the product items within a product category. In box 720, the merchandising service 125 (FIG. 1) presents options for viewing different groupings of the product items in the product category on an online retail environment in accordance with the subcategories defined by the subcategory identification service 118. Further, in various embodiments, the merchandising service 125 (FIG. 1) presents representative product items for each subcategory, such as a price range or grouping, so that a budget-conscious customer, as an example, can more easily see what benefit the customer would get for spending money corresponding to each price range.

Figure 8A:
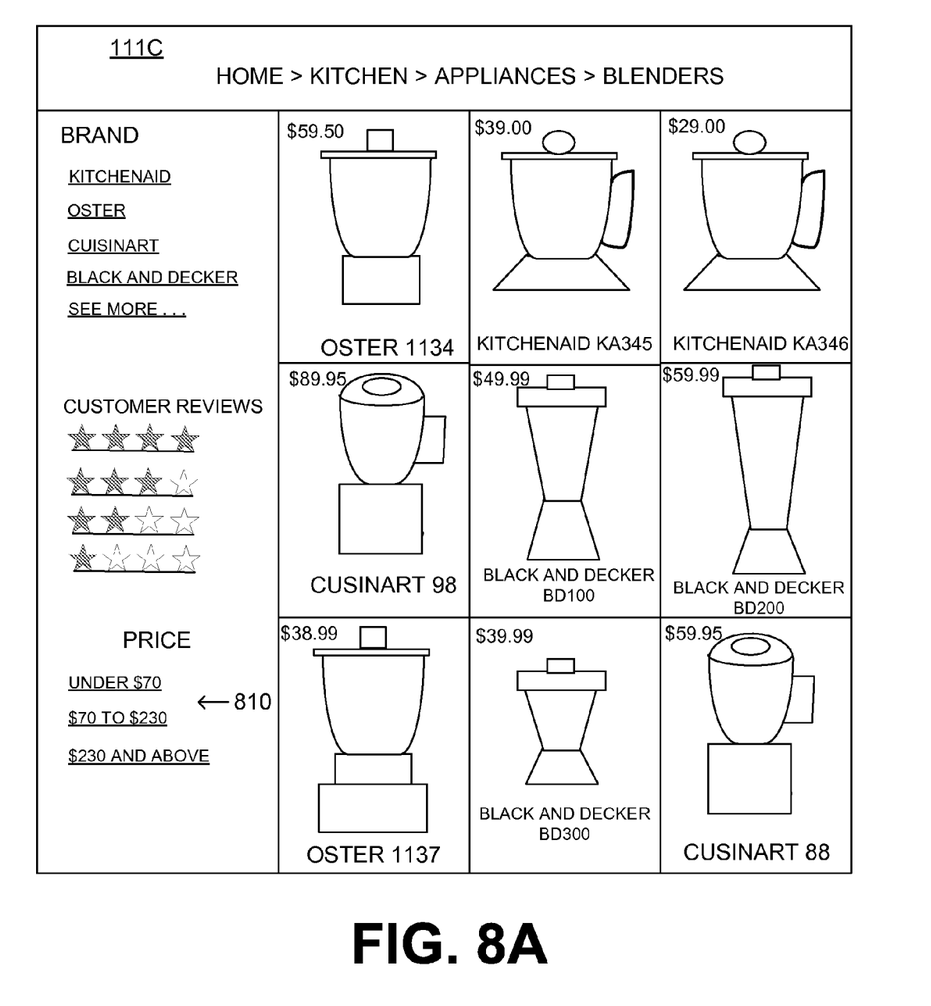
FIGS. 8A-8B are diagrams illustrating network pages showing representations of subcategories of products in a product category according to various embodiments of the present disclosure.
Figure 8B:
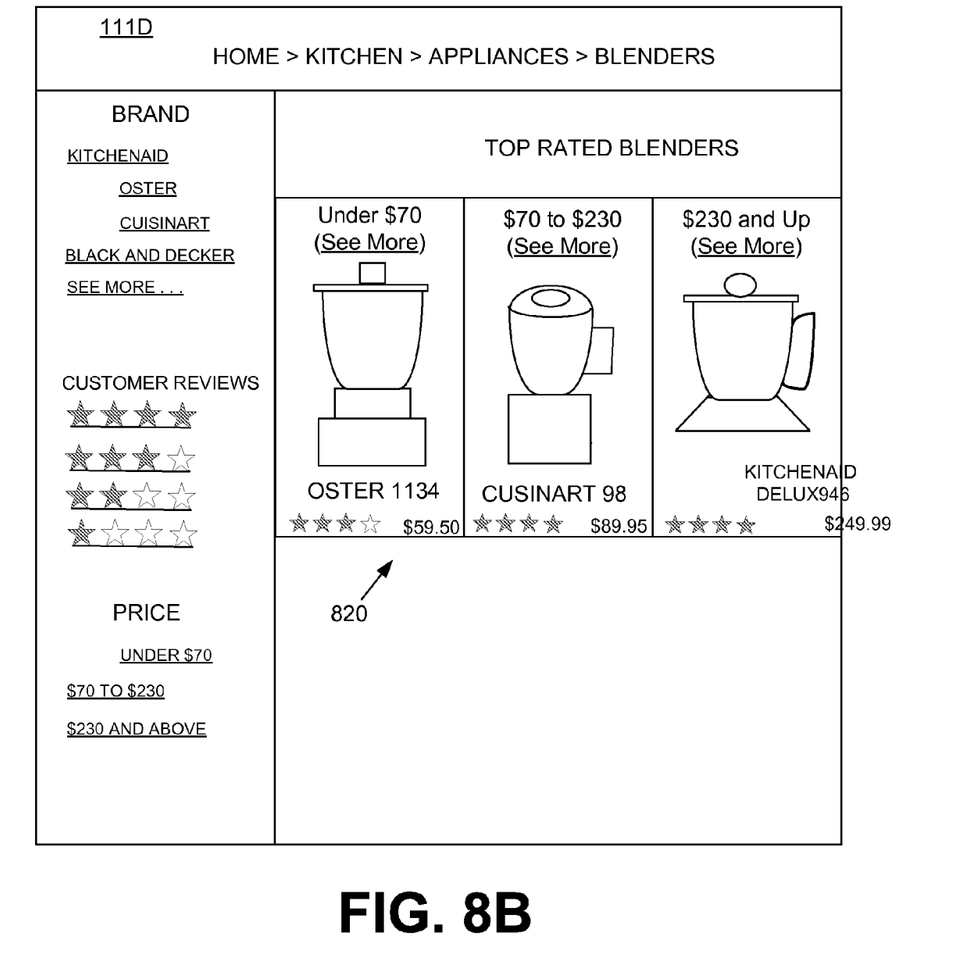

For example, referring to FIG. 8A, a network page 111C showing a representation of a storefront to a blender section of an online retail establishment is depicted. In this example, options for selecting from a grouping 810 of product price bands is shown at the left of the network page 111C, as discussed in relation to FIG. 7. Further, in FIG. 8B, a network page 111D showing a representation of a storefront to a blender section of an online retail establishment is depicted, where the network page 111D features a merchandising widget 820 highlighting product items associated with price bands identified in accordance with the present disclosure. In this example, a featured product item within each price band is shown and additional product items within each price band may be viewed by selecting a "See more" option. In some embodiments, a single price band may be used for merchandising purposes. For example, a particular user may be determined to prefer to purchase items in one of the identified price bands. Therefore, this price band may be used for merchandising over the other price bands. Also, for merchandising purposes, a particular single price band (e.g., $100 to $300) may need to be used which may be the result of combining product items from multiple individual price bands (e.g., $100 to $200 and $200 to $300).

Figure 9:
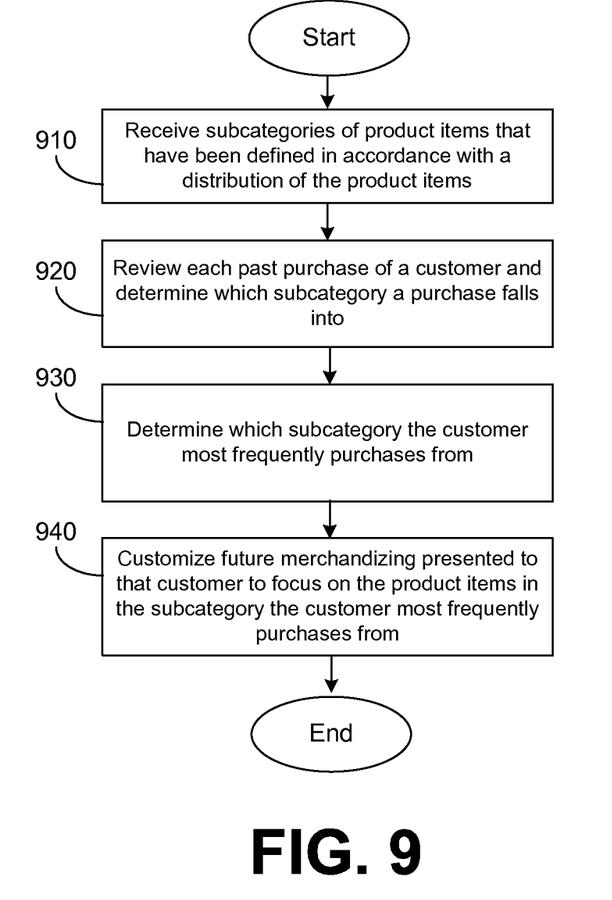
FIG. 9 is a flowchart illustrating one example of functionality implemented as portions of a merchandising service executed in a computing device in the networked environment of FIG. 1 according to various embodiments of the present disclosure.

Referring next to FIG. 9, shown is a flowchart that provides one example of the operation of a portion of the merchandising service 125 (FIG. 1) and related services according to various embodiments. Beginning with box 910, the merchandising service 125 (FIG. 1) receives product subcategories defined and identified by the subcategory identification service 118 (FIG. 1) in accordance with the distribution of product items in a product category. For example, the subcategories may comprise three price bands: a low price band, a medium price band, and a high price band, where each band contains a subset of product items. For a particular customer, the purchase history service 123 (FIG. 1) reviews each past purchase of the customer and determine which subcategory a purchase falls into (e.g., low price band ($0-$70), medium price band ($70-$230), or high price band ($230 and up)), as shown in box 920. Then, in box 930, the purchase history service 123 (FIG. 1) analyzes past customer purchases and determines the subcategory from which the customer most frequently purchases. In this example, the purchase history service 123 would determine the price band from which the customer most frequently purchases. The merchandising service 125 (FIG. 1) receives this determination and customizes future merchandizing presented to that customer based on the received information, as shown in box 940. For example, if it is determined that a given customer typically purchases items from the most expensive price band (e.g., $230 and up), the merchandising service may modify future merchandising for that customer to highlight or focus on product items from the highest price band as opposed to focusing on product items from one of the other price bands or ranges. Also, in some embodiments, such a customer may be presented with product items belonging to a price band preferred by the customer without the items being explicitly labeled as belonging to the price band as displayed to the customer. For example, a customer may be simply shown a low-priced kitchen gadget without any accompanying labels or text indicating that the store considers the item to be a low-priced item or that the customer prefers low-priced products.

In various embodiments, the purchase history service 123 (FIG. 1) may consider separately purchases from each subcategory. For example, the purchase history service 123 (FIG. 1) may determine that a particular customer tends to buy high-priced electronics, but low-priced kitchen gadgets. Also, the browsing history service 124 (FIG. 1) may consider which price band or subcategory a customer most frequently views or visits and this information to customize future merchandising, as generally described above.

The merchandising service 125 (FIG. 1) can suggest appropriately priced items even when there is no available purchase or browsing data, as a non-limiting example, for the customer for the given product category. For example, consider a customer that is just beginning to shop for a Blu-ray disc player. The purchase history service 123 (FIG. 1) would initially not have any useful data about this customer's price preference for Blu-ray disc players to review. But, by reviewing the customer's purchase history for electronics in general, the purchase history service 123 (FIG. 1) can determine that the customer generally buys from the lowest price band in electronics and therefore conclude that the customer will be most interested in low price Blu-ray disc players. Accordingly, the merchandising service 125 (FIG. 1) can target its merchandising as such to the customer. Therefore, by using automated price cluster data in combination with a customer's recent purchase history data, a likely price range for future purchases may be predicted in order to improve automated merchandizing and recommendations for the customer.

Further, identification of pricing subcategories is not limited to being defined using the clustering algorithms previously mentioned. For instance, it may be desired that three groups of subcategories be established whereby a third of sales accounted for the product category is placed in each group or subcategory. Alternatively, a third of views accounted for the product category may be used to partition the products into three groups or subcategories. Further, the subcategories may be monitored to determine the number of clicks or visits each subcategory receives from customers on the online retail establishment providing the subcategories of product items for viewing or browsing. This information may then be used as feedback to adjust the subcategories (or to formulate new subcategories) to attempt to even out the number of visits to each subcategory or to determine what arrangement produces the most sales or visits/clicks. Therefore, customer behavior data may be used in a feedback loop to further define the subcategories after they have been initially selected by the subcategory identification service 118 (FIG. 1) and presented by the merchandising service 125 (FIG. 1).

For example, it may be necessary or desired that a certain number of subcategories be used for a plurality of products. However, the distribution of the products provides four clusters. Accordingly, two of the clusters may be grouped to form a single cluster reducing the number of clusters from four to three. In a first approach, the first two clusters are grouped to form a single cluster. In a second approach, the last two clusters are grouped to form a single cluster. To determine which approach is best, multiple instances on an online retail establishment may be implemented for the first approach and the second approach. The approach that delivers the most sales or the most clicks during a trial period is determined to be the winning approach. Afterwards, the instances following the non-winning approach will be converted to follow the winning approach. Alternatively, in some embodiments, a winning approach may be provided to a merchandising team as a suggested approach to be considered. In a related technique, if a particular price band or range is preferred by customers, than the merchandising team may, based on feedback from the disclosed embodiments, consider reducing the prices of products above the price band to fall within the desired or preferred price band.

In addition, various embodiments evaluate defined groups or subcategories with respect to other features of interest. For example, it may desired that the subcategories contain a certain distribution of top rated products (based on user-reviews) or other class of product items (e.g., 4 star (**) rated products, 3 star (*) rated products, 2 star (**) rated products, etc.) in each group or subcategory. After evaluating the subcategories, if the subcategories are not determined to be evenly distributed or distributed to a set standard, the process of defining the subcategories may be redone until the desired distribution is reached. Accordingly, it may be desired that a highly rated product can be recommended within each defined subcategory. Thus, when a defined group does not have a product item satisfying a set standard or preference, the product items may be re-apportioned to newly defined groups or subcategories.

Figure 10:
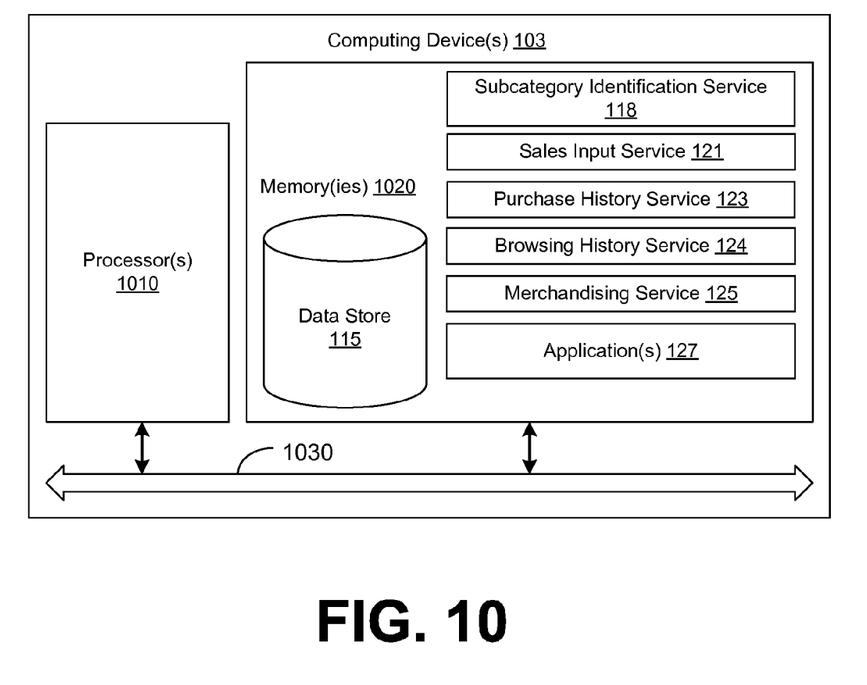
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1010 and a memory 1020, both of which are coupled to a local interface 1030. To this end, the computing device 103 may comprise, for example, at least one server computer or like device. The local interface 1030 may comprise, for example, a data bus with an accompanying address/control bus or other bus structure as can be appreciated.

Stored in the memory 1020 are both data and several components that are executable by the processor 1010. In particular, stored in the memory 1020 and executable by the processor 1010 are the subcategory identification service 118, sales input service 121, purchase history service 123, browsing history service 124, merchandising service 125, and potentially other applications. Also stored in the memory 1020 may be a data store 115 and other data. In addition, an operating system may be stored in the memory 1020 and executable by the processor 1010.

It is understood that there may be other applications that are stored in the memory 1020 and are executable by the processors 1010 as can be appreciated. Where any component discussed herein is implemented in the form of software, any one of a number of programming languages may be employed such as, for example, C, C++, C#, Objective C, Java, Javascript, Perl, PHP (Hypertext Preprocessor), Visual Basic, Python, Ruby, Delphi, Flash, or other programming languages.

A number of software components are stored in the memory 1020 and are executable by the processor 1010. In this respect, the term "executable" means a program file that is in a form that can ultimately be run by the processor 1010. Examples of executable programs may be, for example, a compiled program that can be translated into machine code in a format that can be loaded into a random access portion of the memory 1020 and run by the processor 1010, source code that may be expressed in proper format such as object code that is capable of being loaded into a random access portion of the memory 1020 and executed by the processor 1010, or source code that may be interpreted by another executable program to generate instructions in a random access portion of the memory 1020 to be executed by the processor 1010, etc. An executable program may be stored in any portion or component of the memory 1020 including, for example, random access memory (RAM), read-only memory (ROM), hard drive, solid-state drive, USB (Universal Serial Bus) flash drive, memory card, optical disc such as compact disc (CD) or digital versatile disc (DVD), floppy disk, magnetic tape, or other memory components.

The memory 1020 is defined herein as including both volatile and nonvolatile memory and data storage components. Volatile components are those that do not retain data values upon loss of power. Nonvolatile components are those that retain data upon a loss of power. Thus, the memory 1020 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1010 may represent multiple processors 1010 and the memory 1020 may represent multiple memories 1020 that operate in parallel processing circuits, respectively. In such a case, the local interface 1030 may be an appropriate network 112 (FIG. 1) that facilitates communication between any two of the multiple processors 1010, between any processor 1010 and any of the memories 1020, or between any two of the memories 1020, etc. The local interface 1030 may comprise additional systems designed to coordinate this communication, including, for example, performing load balancing. The processor 1010 may be of electrical or of some other available construction.

Although the subcategory identification service 118, sales input service 121, purchase history service 123, browsing history service 124, merchandising service 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 7, and 9 show the functionality and operation of an implementation of portions of the subcategory identification service 118 and related applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1010 in a computer system or other system. The machine code may be converted from the source code, etc. If embodied in hardware, each block may represent a circuit or a number of interconnected circuits to implement the specified logical function(s).

Although the flowcharts of FIGS. 2, 7, and 9 show a specific order of execution, it is understood that the order of execution may differ from that which is depicted. For example, the order of execution of two or more blocks may be scrambled relative to the order shown. Also, two or more blocks shown in succession in FIGS. 2, 7, and 9 may be executed concurrently or with partial concurrence. Further, in some embodiments, one or more of the blocks shown in FIGS. 2, 7, and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the subcategory identification service 118, sales input service 121, purchase history service 123, browsing history service 124, merchandising service 125, that comprises software or code can be embodied in any non-transitory computer-readable medium for use by or in connection with an instruction execution system such as, for example, a processor 1010 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing computer-executable instructions that, when executed by one or more computer systems, configure the one or more systems to perform operations comprising:
receiving current pricing data associated with at least product items sold on a retail website;
defining groups of the product items based at least in part on a distribution of the product items in accordance with current pricing data and implicit grouping of product items evident in the distribution;
receiving a purchase history of a customer on the retail website and formulating merchandising presentations based at least in part on the purchase history, wherein a group defined based at least in part on the distribution is recommended for viewing by the customer when the customer is determined to prefer purchasing products belonging to the group based at least in part on the purchase history; and
encoding for display at least one network page of the retail website having an option to view subsets of the product items corresponding to the groups of the product items defined based at least in part on the distribution of the product items.

2. The non-transitory computer-readable medium of claim 1, wherein the groups of the product items defined based at least in part on the distribution of the product items are reformulated as updates of the pricing data are received.

3. The non-transitory computer-readable medium of claim 1, wherein the groups of the product items defined based at least in part on the distribution of the product items are reformulated as updates of recent sales volume data are received.

4. The non-transitory computer-readable medium of claim 1, the operations further comprising receiving a browsing history of the customer on the retail website and formulating merchandising presentations based at least in part on the browsing history, wherein a group defined based at least in part on the distribution is recommended for viewing by the customer when the customer is determined, based at least in part on the browsing history, to prefer browsing product items belonging to the group.

5. A system comprising:
a physical data store configured to store product data; and
a computing device in communication with the physical data store, the computing device configured to at least:
receive product data associated with at least product items sold on a retail website;
define groups of the product items based at least in part on a distribution of the product items in accordance with the product data, wherein implicit groups of the product items evident in the distribution are detected;
determine whether the groups of the product items that have been defined each contain a designated product item belonging to a particular class, wherein the product items are redistributed to new groups based at least in part on the distribution of the product items when a product item belonging to the particular class is not a member of any of the defined groups; and
encode for display at least one network page of the retail website having an option to view subsets of the product items corresponding to the groups of the product items defined based at least in part on the distribution of the product items.

6. The system of claim 5, wherein the product data comprises current pricing information for the product items.

7. The system of claim 5, wherein the product data comprises keywords used in product descriptions for the product items.

8. The system of claim 5, wherein the product data comprises keywords used in product reviews for the product items.

9. The system of claim 5, wherein the computing device is further configured to at least receive a purchase history of a customer on the retail website and formulate merchandising presentations based at least in part on the purchase history, wherein a group defined based at least in part on the distribution is recommended for viewing by the customer when the customer is determined, based at least in part on the purchase history, to prefer purchasing products belonging to the group.

10. The system of claim 5, wherein the computing device is further configured to at least receive a purchase history of a customer on the retail website and formulate merchandising presentations based at least in part on the purchase history, wherein a group in a first product category defined based at least in part on the distribution is recommended for viewing by the customer based at least in part on the purchase history denoting a history of the customer buying product items in a second product category that falls in a price range that matches the group.

11. The system of claim 5, wherein computing device is further configured to at least receive a browsing history of a customer and formulate merchandising presentations based at least in part on the browsing history, wherein a group defined based at least in part on the distribution is recommended for viewing on the retail website by the customer when the customer is determined, based at least in part on the browsing history, to prefer browsing products belonging to the group.

12. The system of claim 5, wherein the computing device is further configured to at least:
present for a first group of customers, during a trial period, an option to view the product items grouped into a first plurality of subcategories of the product items;
present for a second group of customers different from the first group, during the trial period, an option to view the product items grouped into a second plurality of subcategories of the product items that is different from the first plurality of subcategories; and
monitor which of the first group and the second group of the product items generates a greater number of actions by customers.

13. The system of claim 12, wherein in the computing device is further configured to at least:
determine a winning grouping of subcategories from the first plurality and the second plurality of subcategories, wherein the winning grouping corresponds to which of the first plurality and the second plurality of the subcategories generates the most actions by the customers during the trial period; and
present for all customers, after expiration of the trial period, an option to view the product items corresponding to the winning grouping of subcategories.

14. The system of claim 13, wherein the actions generated by the customer comprise at least one of website clicks, sales of product items, and generated revenue.

15. The system of claim 5, wherein the computing device is further configured to at least:
determine a number of visits that each group of the product items receives from customers; and
formulate new groups of the product items to even out the number of visits to each group for presentation on the retail website.

16. The system of claim 5, wherein the particular class comprises at least a class of product items all having at least a certain product-rating value, a class of product items all having at least a certain best-seller ranking, and a class of product items all having sold more than a certain quantity-sold value.

17. A method comprising:
receiving, by a computing device, product data associated with at least product items offered for sale on a retail website;
defining, by the computing device, groups of the product items based at least in part on a distribution of the product items, wherein implicit groups of the product items evident in the distribution are detected;
encoding for display, by the computing device, at least one network page of the retail website having an option to view subsets of the product items corresponding to the groups of the product items defined based at least in part on the distribution of the product items;
presenting for a first group of customers, during a trial period, an option to view the product items grouped into a first plurality of subcategories of the product items;
presenting for a second group of customers different from the first group, during the trial period, an option to view the product items grouped into a second plurality of subcategories of the product items that is different from the first plurality of subcategories; and
monitoring which of the first group and the second group of the product items generates a greater number of actions by customers.

18. The method of claim 17, wherein the product data comprises current pricing information for the product items.

19. The method of claim 17, wherein the product data comprises keywords used in product descriptions for the product items.

20. The method of claim 17, wherein the product data comprises keywords used in product reviews for the product items.

21. The method of claim 17, wherein the product data comprises current recent sales volume data for the product items.

22. The method of claim 17, further comprising receiving a purchase history of a customer on the retail website and formulating merchandising presentations based at least in part on the purchase history, wherein a group defined based at least in part on the distribution is recommended for viewing by the customer when the customer is determined, based at least in part on the purchase history, to prefer purchasing products belonging to the group.

23. The method of claim 17, further comprising receiving a browsing history of a customer on the retail website and formulating merchandising presentations based at least in part on the browsing history, wherein a group defined based at least in part on the distribution is recommended for viewing by the customer when the customer is determined, based at least in part on the browsing history, to prefer browsing products belonging to the group.

24. The method of claim 17, further comprising:
determining a winning grouping of subcategories from the first plurality and the second plurality of subcategories, wherein the winning grouping corresponds to which of the first plurality and the second plurality of the subcategories generates the most actions by the customers during the trial period; and
presenting for all customers, after expiration of the trial period, an option to view the product items corresponding to the winning grouping of subcategories.

25. The method of claim 17, further comprising:
determining a number of visits that each group of the product items receives from customers; and
formulating new groups of the product items to even out the number of visits to each group for presentation on the retail website.

* * * * *